(12) United States Patent
Komura et al.

(10) Patent No.: US 7,463,076 B2
(45) Date of Patent: Dec. 9, 2008

(54) POWER CONSUMPTION REDUCTION CIRCUIT FOR CLOCK NETWORK

(75) Inventors: Kazufumi Komura, Kasugai (JP); Takayoshi Nakamura, Kasugai (JP); Keiichi Fujimura, Kasugai (JP); Masahito Hirose, Kasugai (JP); Keigo Nakashima, Kasugai (JP); Masaki Nagato, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/220,676

(22) Filed: Sep. 8, 2005

(65) Prior Publication Data

US 2006/0220722 A1   Oct. 5, 2006

(30) Foreign Application Priority Data

Mar. 31, 2005  (JP) .............................. 2005-103941

(51) Int. Cl.
*G06F 1/04* (2006.01)
(52) U.S. Cl. ........................................ 327/291; 327/293
(58) Field of Classification Search ................. 327/291, 327/293, 295, 376, 377
See application file for complete search history.

(56) References Cited

U.S. PATENT DOCUMENTS 5,583,457 A * 12/1996 Horiguchi et al. ........... 326/121

| | | | |
|---|---|---|---|
| 5,594,371 A | 1/1997 | Douseki | |
| 5,726,946 A | 3/1998 | Yamagata et al. | |
| 5,834,974 A * | 11/1998 | Kim | 330/253 |
| 6,049,245 A * | 4/2000 | Son et al. | 327/544 |
| 6,294,404 B1 * | 9/2001 | Sato | 438/106 |
| 6,327,213 B1 * | 12/2001 | Ooishi | 365/226 |
| 6,681,332 B1 * | 1/2004 | Byrne et al. | 713/300 |
| 6,864,720 B2 | 3/2005 | Kanazawa | |

FOREIGN PATENT DOCUMENTS

| | | |
|---|---|---|
| GB | 2 300 985 A | 11/1996 |
| JP | 06-029834 A | 2/1994 |
| JP | 08-227580 A | 9/1996 |
| JP | 08-228145 A | 9/1996 |
| JP | 08-321763 A | 12/1996 |
| JP | 09-083335 A | 3/1997 |
| JP | 10-303370 A | 11/1998 |
| JP | 2000-082286 | 3/2000 |
| JP | 2000-082950 A | 3/2000 |
| JP | 2003-330568 A | 11/2003 |

* cited by examiner

*Primary Examiner*—Lincoln Donovan
*Assistant Examiner*—Hai L. Nguyen
(74) *Attorney, Agent, or Firm*—Arent Fox LLP

(57) ABSTRACT

A power consumption reduction circuit for reducing power consumed by a clock tree network including a transmission control circuit. The power consumption reduction circuit includes a transmission control circuit for controlling transmission of the clock signal to the buffer circuit group so as to selectively provide and interrupt the clock signal. A switch circuit disconnects the buffer circuit group from a power supply when the transmission control circuit interrupts the clock signal.

20 Claims, 11 Drawing Sheets

POWER CONSUMPTION REDUCTION CIRCUIT FOR CLOCK NETWORK

CROSS-REFERENCE TO RELATED APPLICATIONS

This application is based upon and claims the benefit of priority from the prior Japanese Patent Application No. 2005-103941, filed on Mar. 31, 2005, the entire contents of which are incorporated herein by reference.

BACKGROUND OF THE INVENTION

The present invention relates to a clock network for transmitting a clock signal, and more particularly, to a clock tree network provided with a power consumption reduction function.

In a semiconductor integrated circuit device, synchronization circuits including flip-flop circuits may be provided with a clock signal from a clock tree network configured by buffer circuits. The higher integration of recent semiconductor integrated circuit devices has increased the number of buffer circuits in a clock tree network. Due to the demand for lower power consumption of semiconductor integrated circuit devices, the power consumed by a clock network tree must be reduced.

Figure 1A:
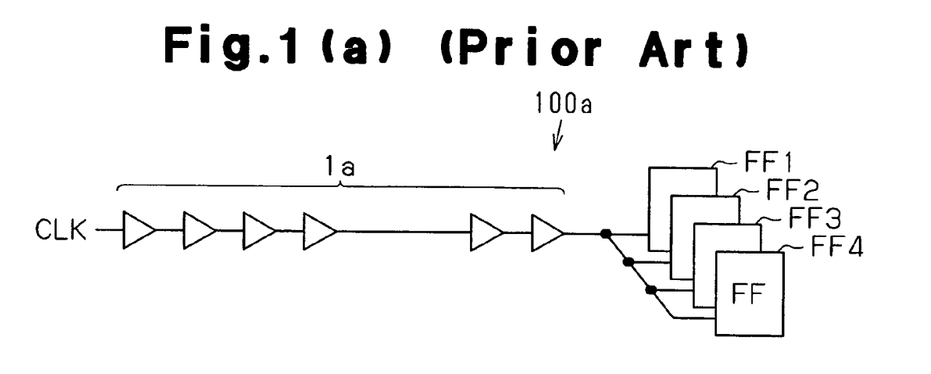
FIG. 1a is a schematic circuit diagram showing a first prior art example of a clock network.

FIG. 1a is a schematic circuit diagram showing a first prior art example of a clock network 100a. The clock network 100a provides a clock signal CLK in parallel to a plurality of flip-flop circuits FF1 to FF4. The clock signal CLK is provided to the flip-flop circuits FF1 to FF4 via a buffer circuit group 1a.

Figure 1B:
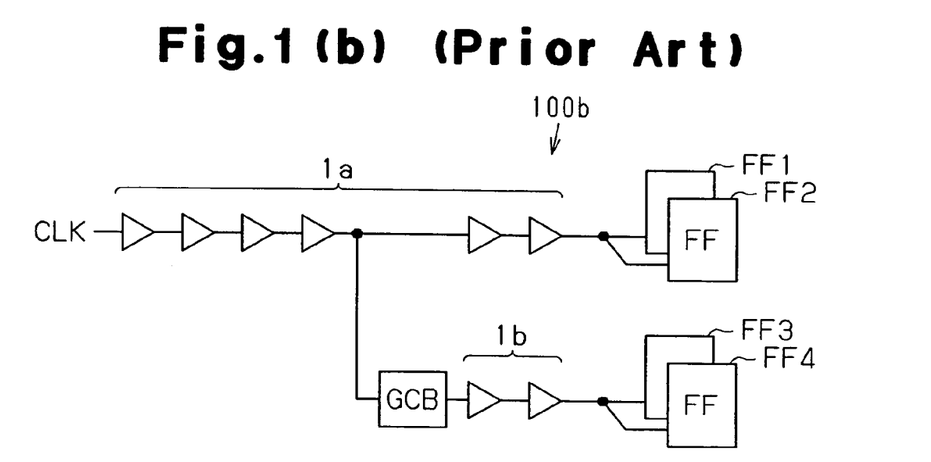
FIG. 1b is a schematic circuit diagram showing a second prior art example of a clock network including a GCB, which functions as a transmission control circuit.

FIG. 1b is a schematic circuit diagram showing a second prior art example of a clock tree network 100b including a gated clock buffer (GCB), which functions as a transmission control circuit. Flip-flop circuits FF1 and FF2 are provided with a clock signal CLK via a buffer circuit group 1a. Flip-flop circuits FF3 and FF4 are provided with the clock signal CLK via the GCB and a buffer circuit group 1b.

When there is no need to provide the flip-flop circuits FF3 and FF4 with the clock signal CLK, the GCB interrupts the clock signal CLK provided to the buffer circuit group 1b. This reduces the power consumption of the buffer circuit group 1b.

Less buffer circuits and a shorter network are effective for reducing the power consumed by the above-described clock tree network. The use of a transistor having a relatively low threshold in each buffer circuit to increase the load driving capacity is also effective. However, a transistor having a relatively low threshold would increase leakage current during inactivation.

Figure 2:
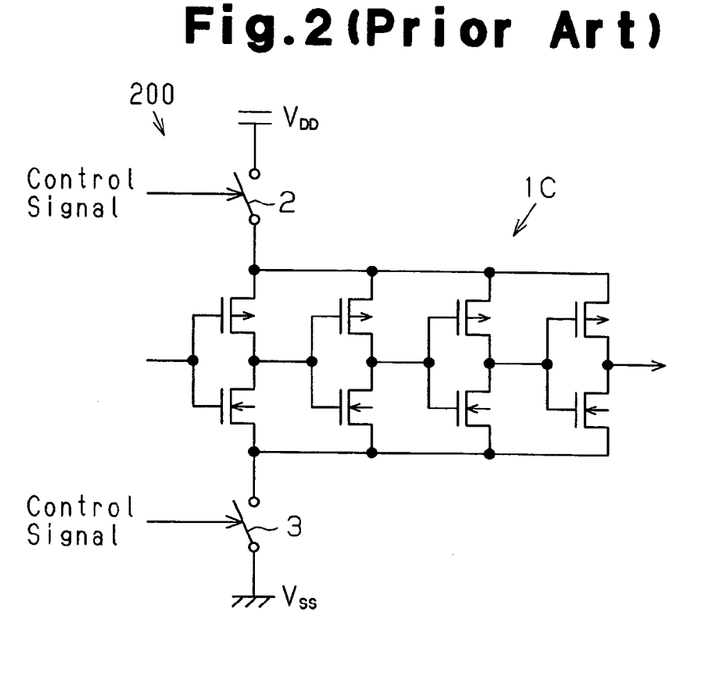
FIG. 2 is a schematic circuit diagram showing a third prior art example of a clock network.

FIG. 2 is a schematic circuit diagram showing a third prior art example of a clock network 200 for decreasing leakage current in buffer circuits, which configure the clock network 200. The clock network 200 includes a switch circuit 2, which is connected between a buffer circuit group 1c and a power supply VDD, and a switch circuit 3, which is connected between the buffer circuit group 1c and a power supply VSS. In a standby state, the switch circuit 2 and the switch circuit 3 are disconnected from the power supplies VDD and VSS, respectively. This stops the flow of leakage current from the power supply VDD to the power supply VSS in the standby state.

Figure 3:
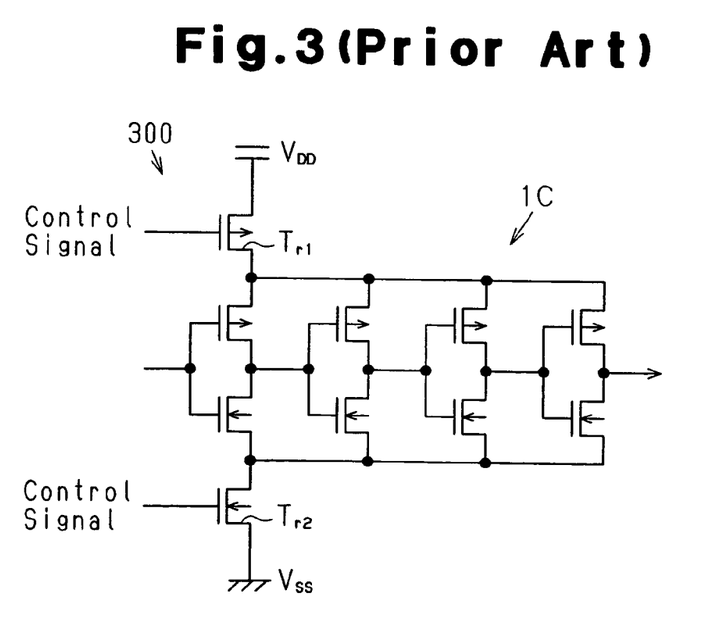
FIG. 3 is a schematic circuit diagram showing a fourth prior art example of a clock network.

FIG. 3 is a schematic circuit diagram showing a fourth prior art example of a clock network 300. In the clock network 300, the switch circuit 2 and switch circuit 3 of the clock network 200 are respectively embodied by a P-channel MOS transistor Tr1 and an N-channel MOS transistor Tr2. In the clock network 300, when a buffer circuit group 1c is in a standby state (power save mode), the transistors Tr1 and Tr2 are inactivated to stop the flow of leakage current from the power supply VDD to the power supply VSS.

Due to the miniaturization of semiconductor integrated circuit devices in recent years, when the gate of a transistor is narrowed, the leakage current during inactivation tends to relatively increase. By using the transistors Tr1 and Tr2 having a relatively high threshold, leakage current would be decreased during inactivation. Further, in the buffer circuit group 1c, the use of a transistor having a relatively low threshold would increases the load drive capacity. This would reduce the number of buffer circuits and shorten the network length.

Japanese Laid-Open Patent Publication No. 2000-82286 describes a CMOS circuit connected to a power supply switch including a transistor, which is inactivated during a standby state. Due to the power supply switch, the leakage current produced when the CMOS circuit is in the standby state is only the leakage current produced by a power supply switch including a transistor.

SUMMARY OF THE INVENTION

In the clock tree network including the GCB and shown in FIG. 1b, the power consumption of the buffer circuit group 1b is reduced when the GCB interrupts the clock signal CLK and suspends the operation of the buffer circuit group 1b. However, leakage current does not stop current flow in the buffer circuit group 1b. Thus, the leakage current hinders reduction of power consumption. Particularly, when using transistors having a relatively low threshold to ensure the load driving capacity, leakage current increases in the buffer circuit group 1b.

In Japanese Laid-Open Patent Publication No. 2000-82286 or in the buffer circuit group 1c including switch circuits for reducing leakage current and shown in FIG. 3, when a chip is entirely set in the power save mode, in response to the control signal, the buffer circuit group 1c is disconnected from the power supply VDD and the power supply VSS. This prevents the generation of leakage current. However, when the GCB interrupts the clock signal CLK provided to the buffer circuit group, which is part of the clock tree network, the switch circuits of the buffer circuit group are not inactivated. As a result, leakage current is not sufficiently suppressed.

The present invention provides a power consumption reduction circuit for reducing the power consumed by a clock tree network including a transmission control circuit.

One aspect of the present invention is a power consumption reduction circuit for use in a clock network including a power supply and a buffer circuit group for transmitting a clock signal. The power consumption reduction circuit includes a transmission control circuit for controlling transmission of the clock signal to the buffer circuit group so as to selectively provide and interrupt the clock signal. A switch circuit, connected between the buffer circuit group and the power supply, disconnects the buffer circuit group and the power supply when the transmission control circuit interrupts the clock signal.

Another aspect of the present invention includes a clock network for use with a power supply. The clock network includes a buffer circuit group for transmitting a clock signal. A transmission control circuit controls transmission of the clock signal to the buffer circuit group so as to selectively provide and interrupt the clock signal. A switch circuit, connected between the buffer circuit group and the power supply, disconnects the buffer circuit group and the power supply when the transmission control circuit interrupts the clock signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 4:
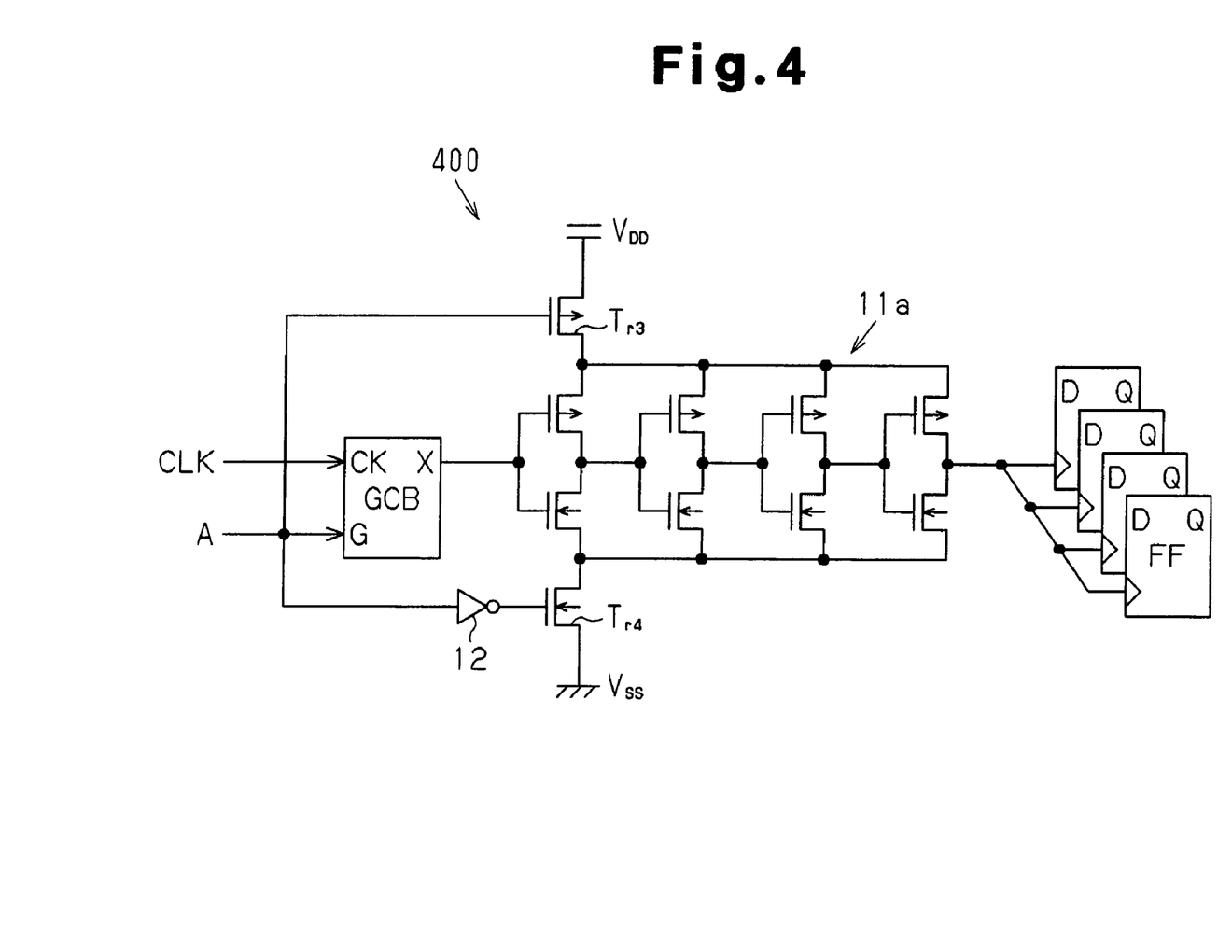
FIG. 4 is a schematic circuit diagram showing a clock tree network provided with a power consumption reduction function according to a first embodiment of the present invention.

FIG. 4 is a schematic circuit diagram showing a clock tree network 400 provided with a power consumption reduction function according to a first embodiment of the present invention. The clock tree network 400 includes a buffer circuit group 11a, which receives a clock signal CLK via a GCB functioning as a transmission control circuit. The buffer circuit group 11a includes an even number of series connected inverter circuits (buffer circuits).

The GCB is provided with the clock signal CLK and a control signal A. The GCB provides the buffer circuit group 11a with the clock signal CLK as an output signal X when the control signal A is set at a low (L) level. The GCB fixes the output signal X at the L level when the control signal A is set at a high (H) level.

A plurality of flip-flop circuits FF are connected in parallel to the output terminal of the buffer circuit group 11a. The buffer circuit group 11a is connected to a high potential power supply VDD via a P-channel MOS transistor Tr3, which functions as a switch circuit, and a lower power supply VSS via an N-channel MOS transistor Tr4, which also functions as a switch circuit. The transistors Tr3 and Tr4 have relatively high thresholds. The buffer circuit group 11a is configured by transistors having relatively low thresholds.

The gate of the transistor Tr3 is provided with the control signal A. An inverter circuit 12 inverts the control signal A and generates an inverted control signal, which is provided to the gate of the transistor Tr4. Accordingly, when the control signal A is set at an L level, that is, when the clock signal CLK is provided from the GCB to the buffer circuit group 11a, the transistors Tr3 and Tr4 are activated. This activates the buffer circuit group 11a and provides the clock signal CLK to each of the flip-flop circuits FF.

When the control signal A is set at an H level, that is, when the output signal of the GCB is fixed at an L level, the transistors Tr3 and Tr4 are inactivated. This disconnects the buffer circuit group 11a from the power supplies VDD and VSS. Accordingly, the buffer circuit group 11a is inactivated, and an indefinite output signal is generated at an output node of the buffer circuit group 11a.

The clock tree network 400 of the first embodiment has the advantages described below.

(1) When the GCB is activated in accordance with the control signal A, the buffer circuit group 11a is activated and the clock signal CLK is provided in parallel to the flip-flop circuits FF.

(2) In synchronism with when the GCB is inactivated in accordance with the control signal A, the buffer circuit group 11a is disconnected from the power supplies VDD and VSS. This inactivates the buffer circuit group 11a.

(3) The transistors Tr3 and Tr4 have relatively high thresholds. This reduces leakage current from the power supply VDD to the power supply VSS when the buffer circuit group 11a is inactivated.

(4) In synchronism with the inactivation of the GCB, the transistors Tr3 and Tr4 are inactivated. Accordingly, when the buffer circuit group 11a is inactivated, the transistors Tr3 and Tr4 are inactivated to reduce leakage current.

Figure 5:
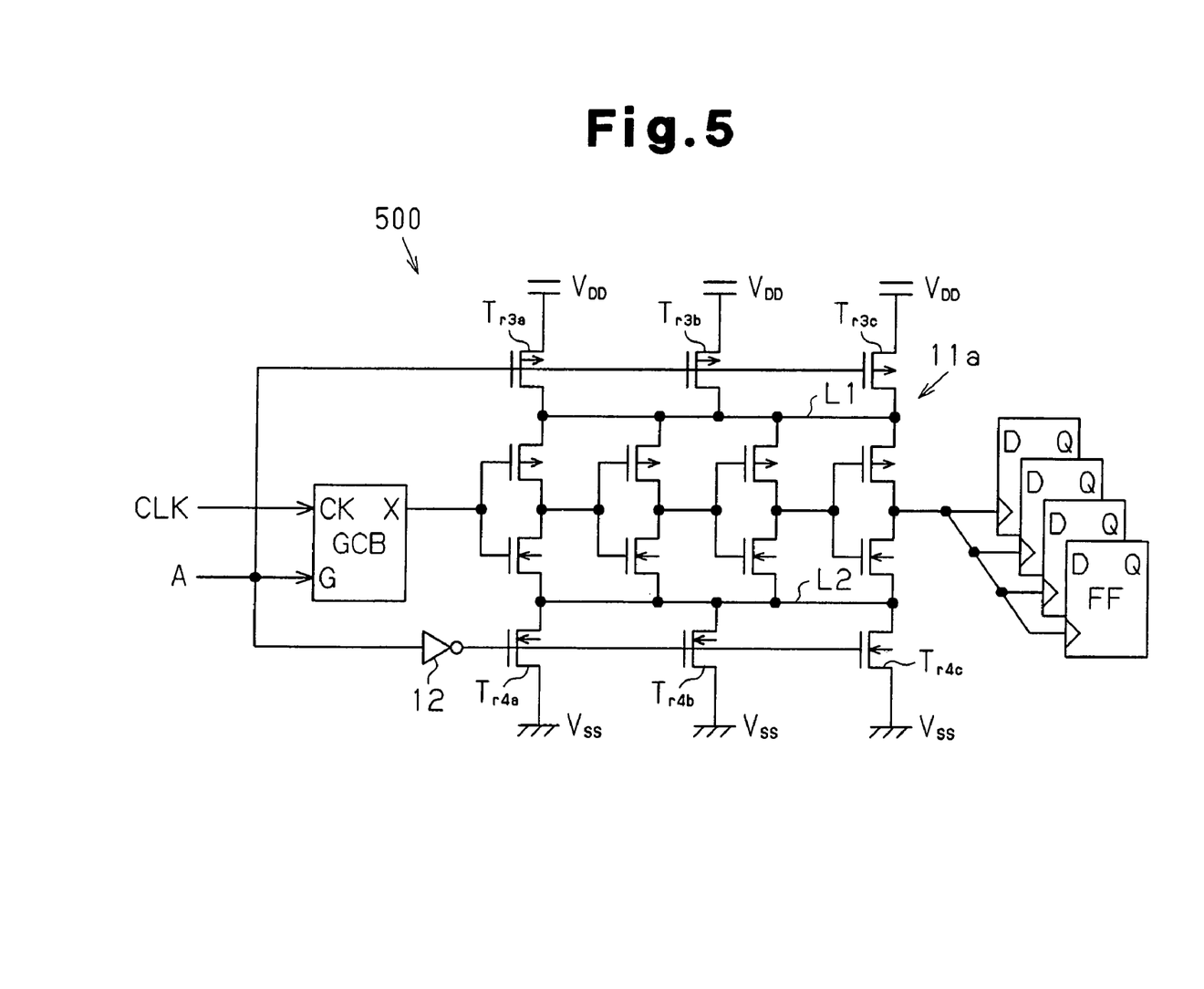
FIG. 5 is a schematic circuit diagram showing a clock tree network provided with a power consumption reduction function according to a second embodiment of the present invention.

FIG. 5 is a schematic circuit diagram showing a clock tree network 500 provided with a power consumption reduction function according to a second embodiment of the present invention. The clock tree network 500 suppresses differences in wiring resistances between the power supply VDD and inverter circuits of a buffer circuit group 11a and between the power supply VSS and the inverter circuits.

When the buffer circuit group 11a is configured by a large number of buffer circuits, or a large number of inverter circuits, concentration of switch circuits for connecting the inverter circuits to the power supply VDD and the power supply VSS increases differences in the resistances between the inverter circuits and the power supply VDD and between the inverter circuits and the power supply VSS.

Thus, to decrease the differences in the resistances between the inverter circuits and the power supply VDD and between the inverter circuits and the power supply VSS, transistors Tr3a to Tr3c are distributed between the power supply VDD and a high potential power supply line (power supply node) L1 of the inverter circuits. In the same manner, transistors Tr4a to Tr4c are distributed between the power supply VSS and a low potential power supply line (power supply node) L2 of the inverter circuits.

In addition to the advantages of the clock tree network 400 of the first embodiment that controls the clock signal CLK provided to the buffer circuit group 11a with the GCB, the clock tree network 500 of the second embodiment has an advantage in that differences in the characteristics of the buffer circuits are decreased.

Figure 6:
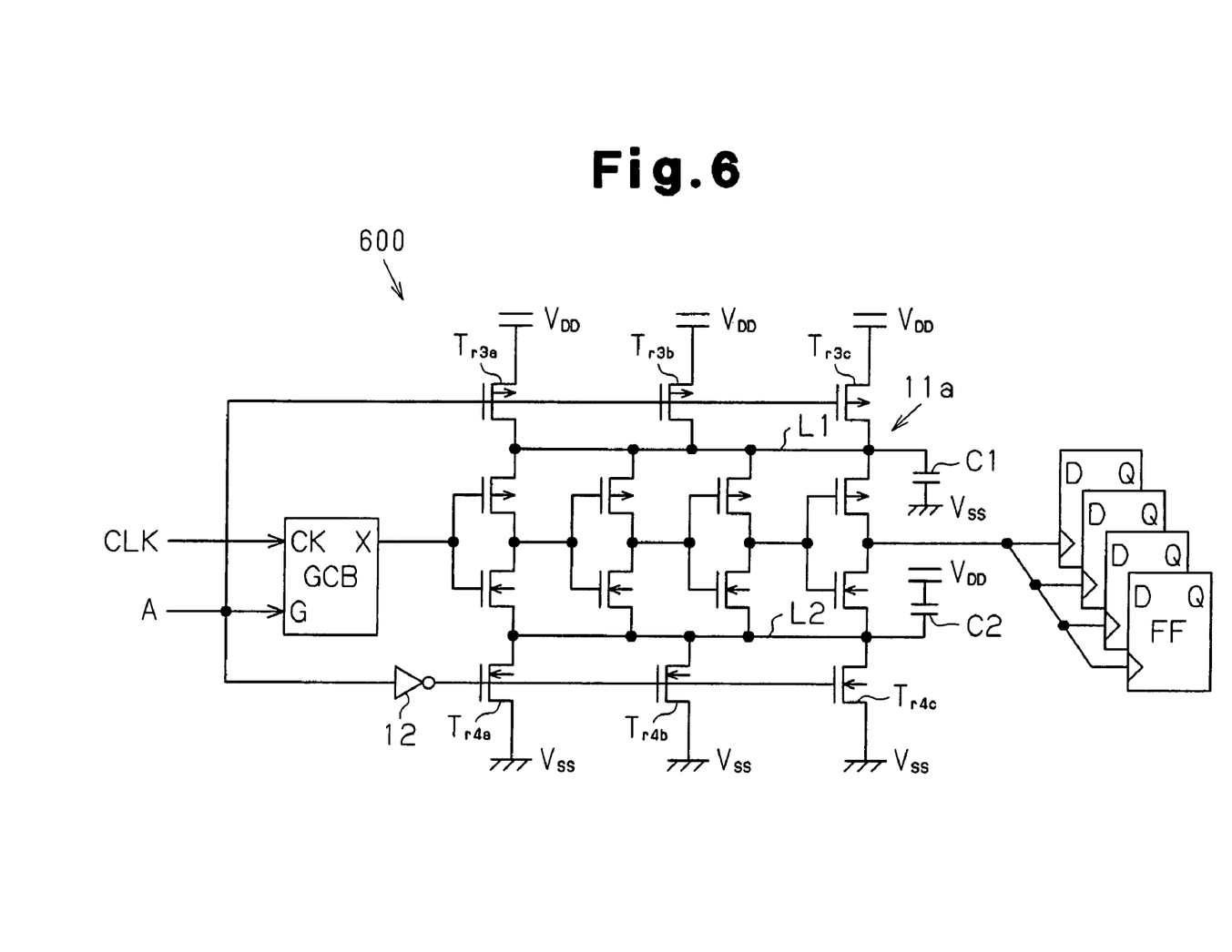
FIG. 6 is a schematic circuit diagram showing a clock tree network provided with a power consumption reduction function according to a third embodiment of the present invention.

FIG. 6 is a schematic circuit diagram showing a clock tree network 600 provided with a power consumption reduction function according to a third embodiment of the present invention. The clock tree network 600 is configured by adding to the clock tree network 500 of the second embodiment, a capacitor C1, which is connected between the high potential power supply line L1 and the power supply VSS, and a capacitor C2, which is connected between the low potential power supply line L2 and the power supply VDD.

With the configuration of the clock tree network 600, when the transistors Tr3a to Tr3c perform switching operations, the capacitor C1 absorbs noise produced at the high potential power supply line L1 due to gate coupling that occurs between the high potential power supply line L1 and the gates of the transistors Tr3a to Tr3c.

Further, the capacitor C2 absorbs noise produced at the low potential power supply line L2 due to gate coupling that occurs between the low potential power supply line L2 and the gates of the transistors Tr4a to Tr4c.

In addition to the advantages of the clock tree network 500 of the second embodiment, the clock tree network 600 has an advantage in that the absorption of noise with the capacitors C1 and C2 stabilizes the operation of each inverter circuit.

Figure 7:
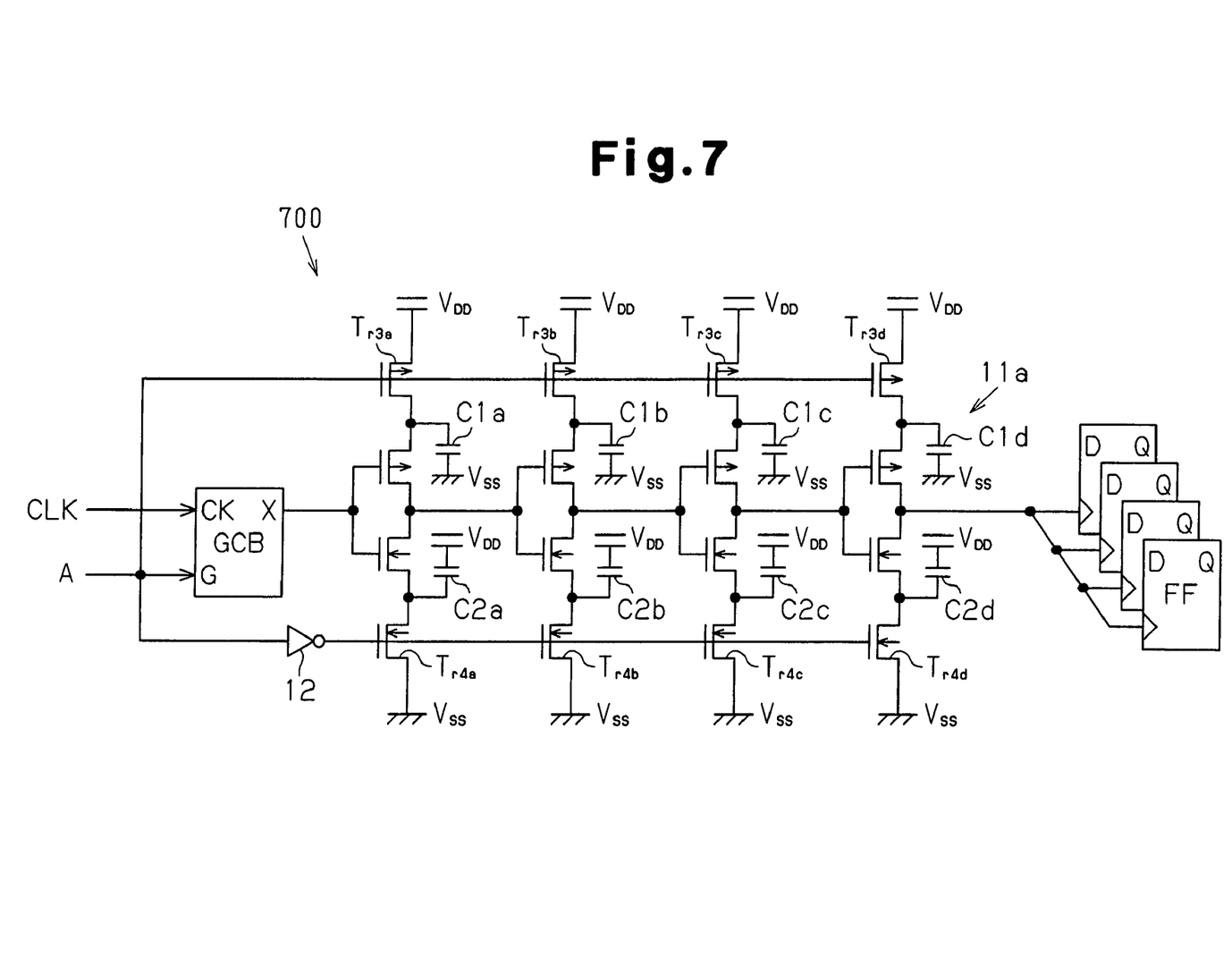
FIG. 7 is a schematic circuit diagram showing a clock tree network provided with a power consumption reduction function according to a fourth embodiment of the present invention.

FIG. 7 is a schematic circuit diagram showing a clock tree network 700 provided with a power consumption reduction function according to a fourth embodiment of the present invention. To configure the clock tree network 700, each inverter circuit of the clock tree network 600 in the third embodiment is additionally provided with the switch circuit connected to the power supply VDD, the switch circuit connected to the power supply VSS, and capacitors connected to each power supply node.

More specifically, transistors Tr3a to Tr3d are respectively connected between the inverter circuits and the power supply VDD. Further, transistors Tr4a to Tr4d are respectively connected between the inverter circuits and the power supply VSS.

Further, capacitors C1a to C1d are respectively connected between the power supply VSS and a node between the inverter circuits and corresponding transistors Tr3a to Tr3d. Capacitors C2a to C2d are respectively connected between the power supply VDD and a node between the inverter circuits and corresponding transistors Tr4a to Tr4d.

In the clock tree network 700 of the fourth embodiment, the resistance between each inverter circuit and the power supply VDD and the resistance between each inverter circuit and the power supply VSS are uniformed. Further, a capacitor is connected to the power supply node of each inverter circuit. Thus, the noise produced at the power supply node of each inverter circuit is suppressed and uniformed.

Accordingly, in comparison with the clock tree network 600 of the third embodiment, in the fourth embodiment, the operations of the inverter circuits configuring the buffer circuit group 11a are further stabilized.

Figure 8:
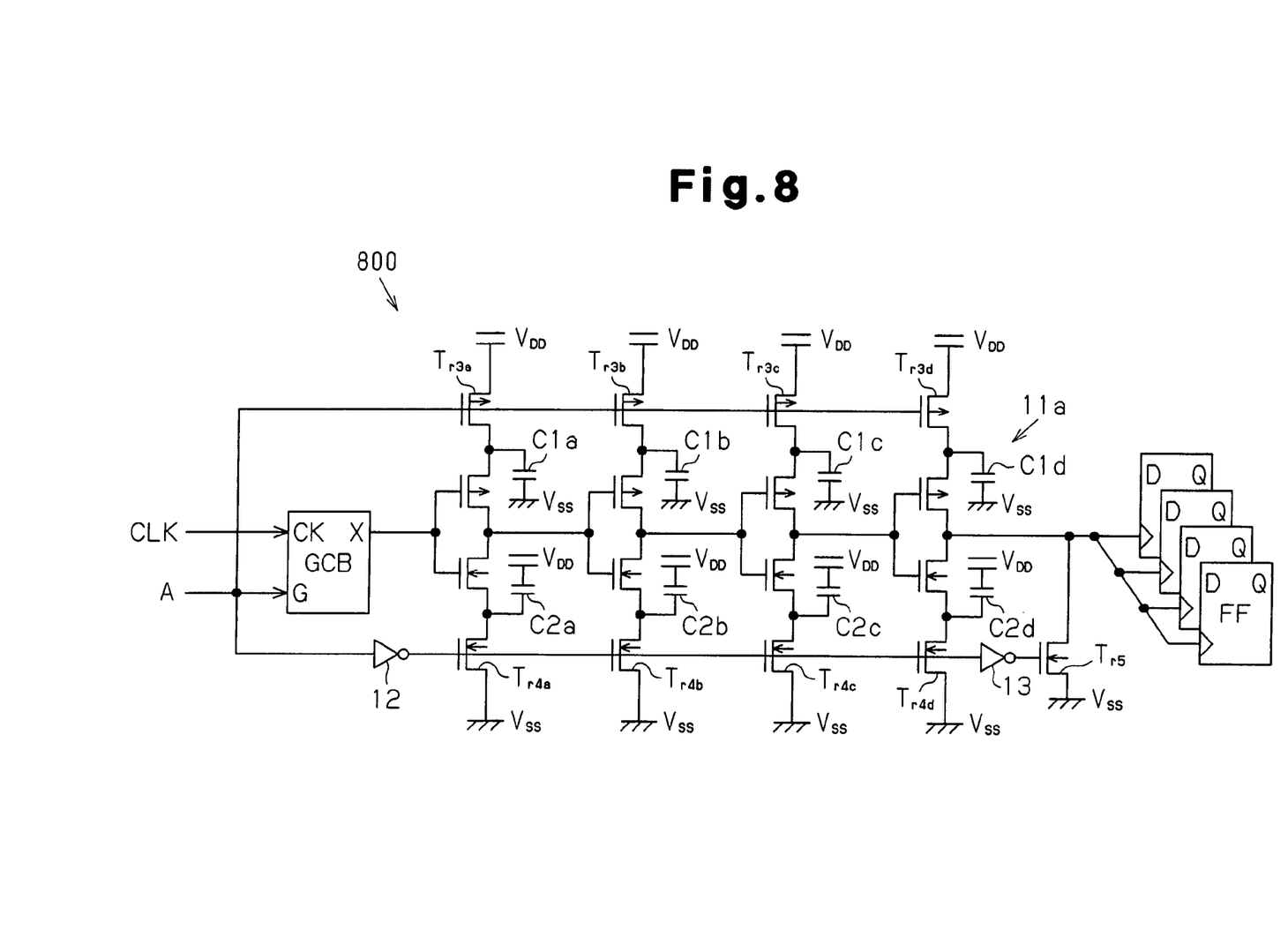
FIG. 8 is a schematic circuit diagram showing a clock tree network provided with a power consumption reduction function according to a fifth embodiment of the present invention.

FIG. 8 is a schematic circuit diagram showing a clock tree network 800 provided with a power consumption reduction function according to a fifth embodiment of the present invention. The clock tree network 800 is configured by adding a clamp circuit for clamping an output node of the buffer circuit group 11a at the level of the power supply VSS when the buffer circuit group 11a is inactivated.

More specifically, the output node of the buffer circuit group 11a is connected to the power supply VSS via an N-channel MOS transistor Tr5. The gate of the transistor Tr5 is provided with an inverted signal generated by an inverter circuit 13 inverting the signal provided to the gates of the transistors Tr4a to Tr4d. Accordingly, the phase of the gate signal of the transistor Tr5 is the same as the control signal A provided to the GCB.

In the clock tree network 800 of the fifth embodiment, when the control signal A is set at an H level, that is, when the transistors Tr3a to Tr3d and Tr4a to Tr4d are inactivated and the buffer circuit group 11a is inactivated, the transistor Tr5 is activated to clamp the output node of the buffer circuit group 11a at the level of the power supply VSS.

When the buffer circuit group 11a is inactivated and the potential at the output node is indefinite, there is a tendency for the operation of the buffer circuit group 11a to be affected by crosstalk noise from proximal wires. However, such influence from noise is eliminated by clamping the output node at the level of the power supply VSS.

Accordingly, in addition to the advantages of the clock tree network 700 of the fourth embodiment, the clock tree network 800 of the fifth embodiment has an advantage in that the operation of the buffer circuit group 11a in an inactivated state is stabilized.

Figure 9:
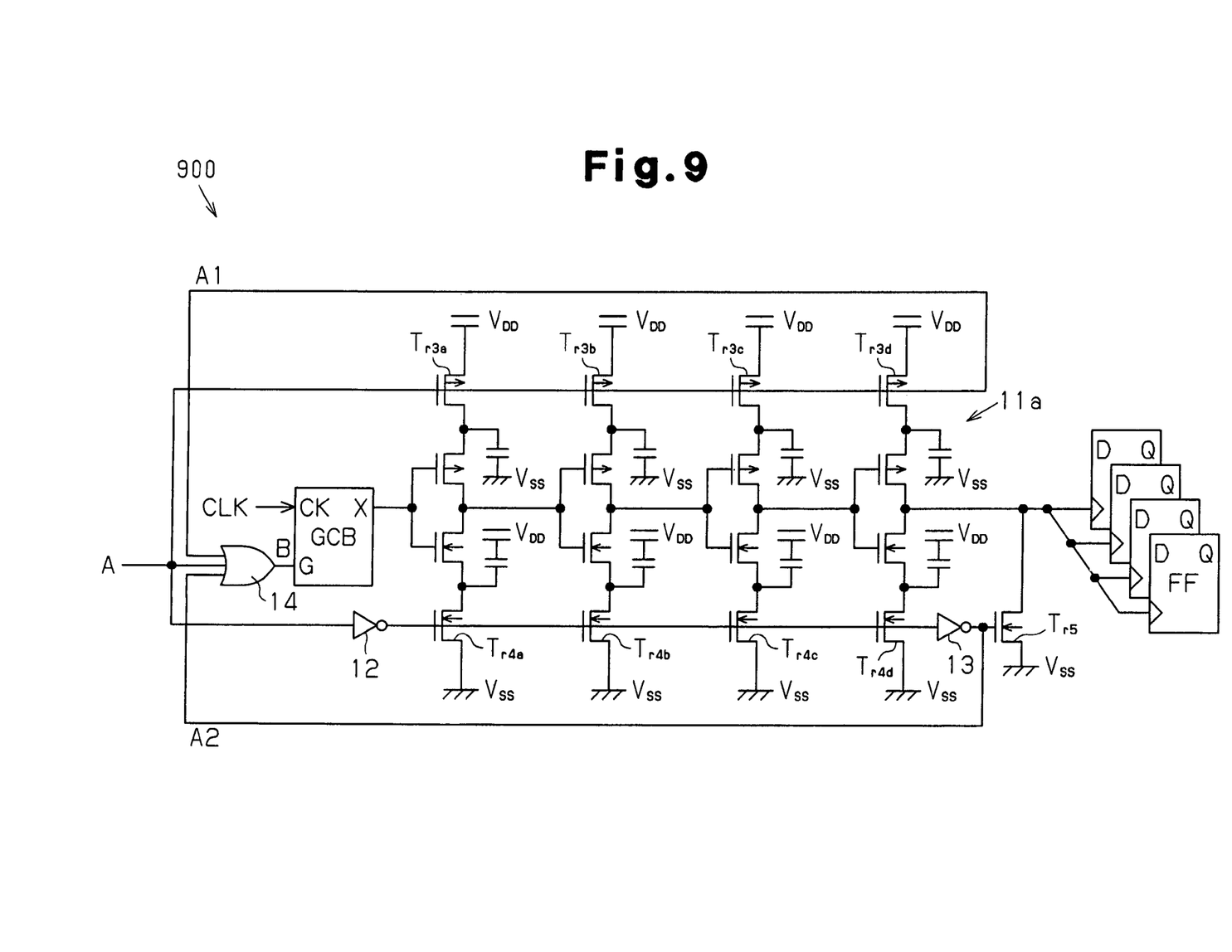
FIG. 9 is a schematic circuit diagram showing a clock tree network provided with a power consumption reduction function according to a sixth embodiment of the present invention.

FIG. 9 is a schematic circuit diagram showing a clock tree network 900 provided with a power consumption reduction function according to a sixth embodiment of the present invention. The clock tree network 900 is an improvement of the clock tree network 800 of the fifth embodiment. In the clock tree network 900 of the sixth embodiment, when the buffer circuit group 11a shifts from an inactivated state to an activated state, all of the transistors Tr3a to Tr3d and Tr4a to Tr4d are activated, and each of the inverter circuits configuring the buffer circuit group 11a are activated. Then, the clock signal CLK is provided from the GCB to the buffer circuit group 11a.

More specifically, the control signal A is provided to an OR circuit 14. Further, the control signal A is provided to the gates of the transistors Tr3a to Tr3d and then provided as control signal A1 to the OR circuit 14. The control signal A is also provided to the gates of the transistors Tr4a to Tr4d and then provided as control signal A2 to the OR circuit 14. The control signals A1 and A2 are provided to the OR circuit 14 slightly delayed from the control signal A. The OR circuit 14 provides an output signal B to the GCB as a control signal.

Figure 10:
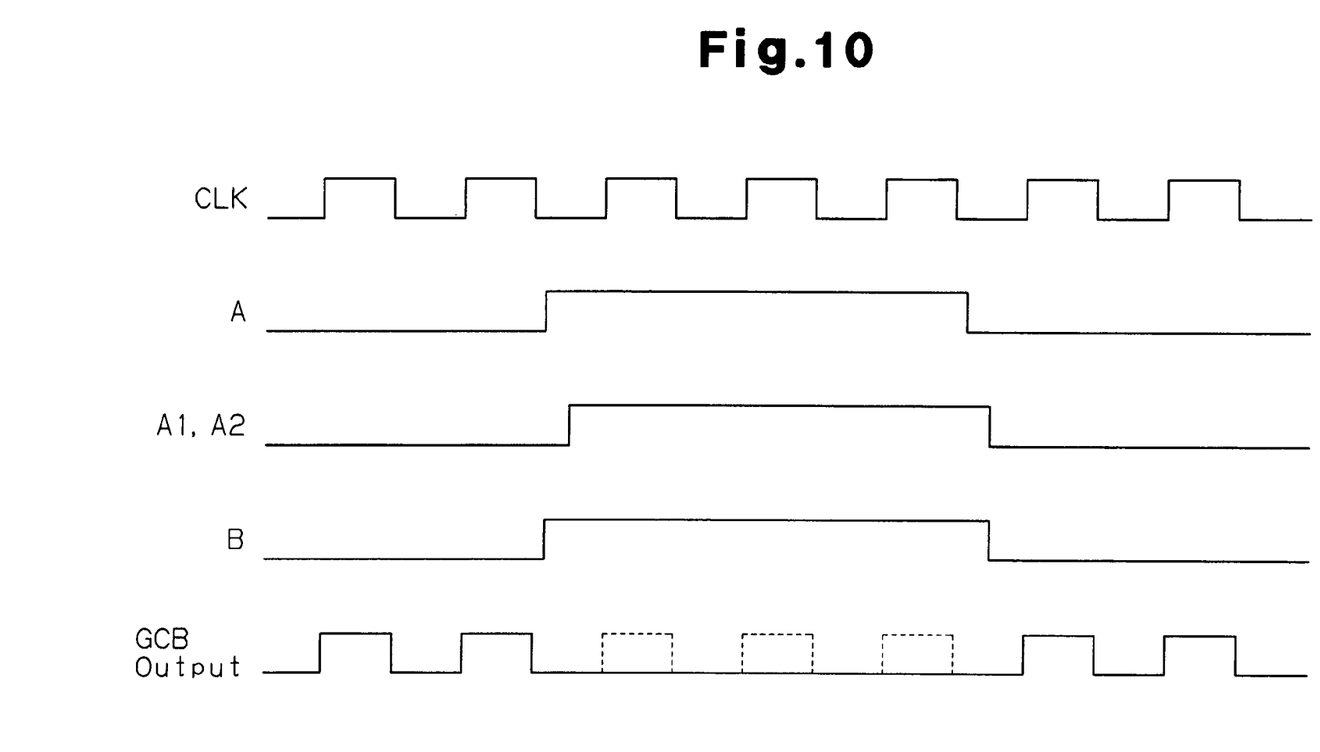
FIG. 10 is a timing and waveform diagram showing the operation of the sixth embodiment of the present invention.

Referring to FIG. 10, in the clock tree network 900 of the sixth embodiment, when the control signal A rises from an L level to an H level, the output signal B of the OR circuit 14 immediately rises in response to the rising of the control signal A. This inactivates the GCB and stops the output of the clock signal CLK. If the control signal A falls from the H level to the L level, the output signal B of the OR circuit 14 falls to an L level when the output signal B and the control signals A, A1, and A2 have all fallen to an L level. Accordingly, the transistors Tr3a to Tr3d and Tr4a to Tr4d are all activated, and the buffer circuit group 11a is activated. Then, the GCB provides the clock signal CLK to the buffer circuit group 11a.

The clock tree network 900 functions to stabilize the clock signal CLK provided from the buffer circuit group 11a to the flip-flop circuits FF. If the clock signal CLK is provided before the buffer circuit group 11a is completely activated, the propagation time of the clock signal CLK in the buffer circuit group 11a would become unstable. In such a case, the clock tree network 900 would become out of synchronization with other clock tree networks. The clock tree network 900 of the sixth embodiment is configured to eliminate such a deficiency.

Figure 11:
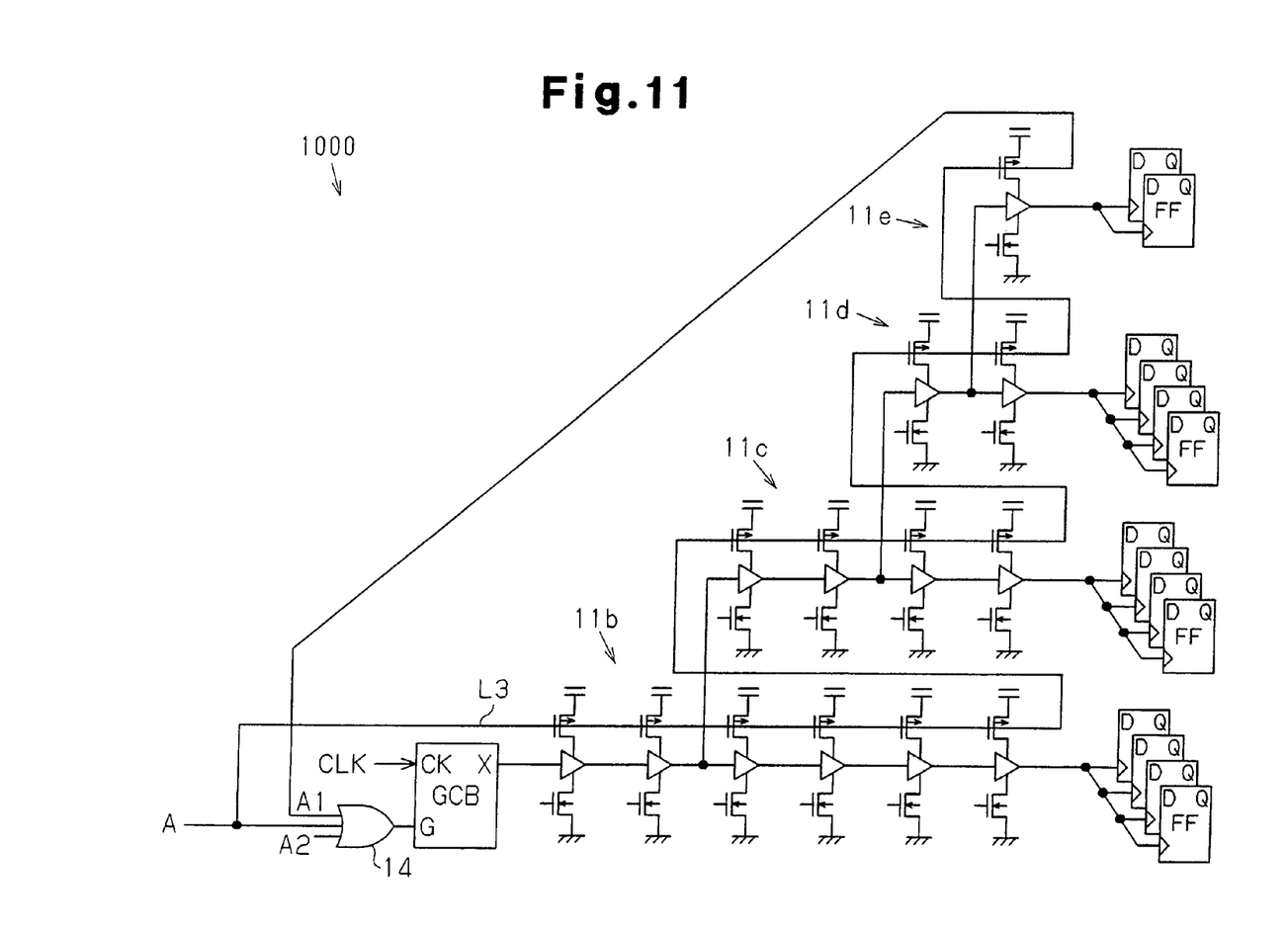
FIG. 11 is a schematic circuit diagram showing a clock tree network provided with a power consumption reduction function according to a seventh embodiment of the present invention.

FIG. 11 is a schematic circuit diagram showing a clock tree network 1000 provided with a power consumption reduction function according to a seventh embodiment of the present invention. The clock tree network 1000 includes a buffer circuit group 11b, which has a configuration similar to that of the clock tree network 900 in the sixth embodiment, and buffer circuit groups 11c to 11e, which receive the clock signal CLK from the same GCB as the buffer circuit group 11b.

For each of the buffer circuit groups 11b to 11e provided with the clock signal CLK from the same GCB, the control signal A of the GCB is provided through a single line L3 to the gate of the transistor functioning as the switch circuit for supplying high potential power. The terminal end of the line L3 is connected to a first input terminal of an OR circuit 14.

Further, the gate of the transistor functioning as the switch circuit for supplying low potential power in each of the buffer circuit groups 11b to 11e is provided with the inverted signal of the control signal A through a line (not shown). The terminal end of the line is connected to a second input terminal of the OR circuit 14.

Accordingly, with regard to the buffer circuit groups 11b to 11e in the clock tree network provided with the clock signal CLK from the same GCB, the clock tree network 1000 of the seventh embodiment has the same advantages as the clock tree network 900 of the sixth embodiment.

Figure 12:
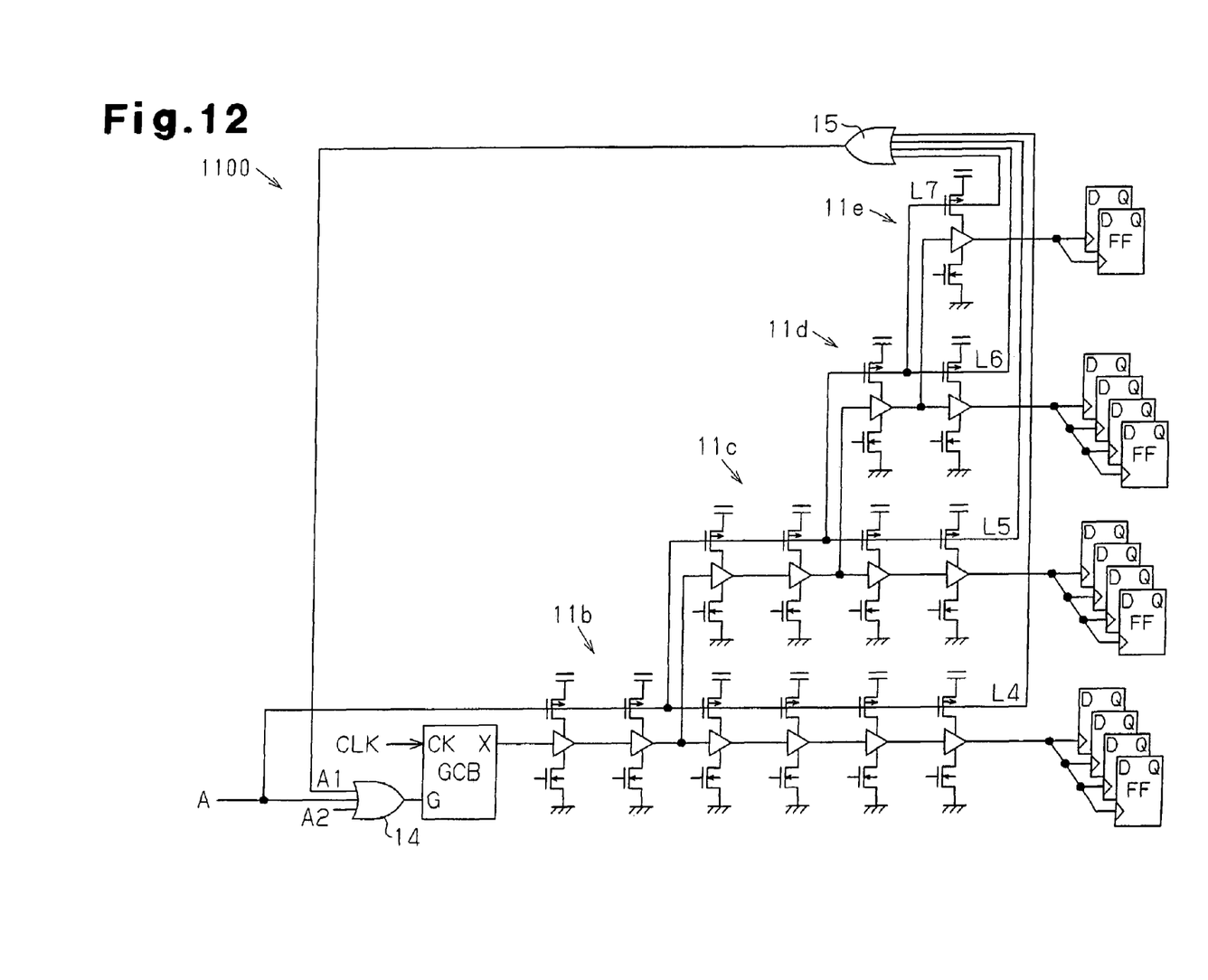
FIG. 12 is a schematic circuit diagram showing a clock tree network provided with a power consumption reduction function according to an eighth embodiment of the present invention.

FIG. 12 is a schematic circuit diagram showing a clock tree network 1100 provided with a power consumption reduction function according to an eighth embodiment of the present invention. The clock tree network 1100 is configured by adding to the clock tree network 1000 of the seventh embodiment a branch line for each of the buffer circuit groups 11b to 11e to provide the control signal A.

More specifically, the gates of the transistors (switch circuits), connected between the high potential power supply and the buffer circuit groups 11b to 11e receiving the clock signal CLK from the same GCB, receive the control signal A of the GCB through a corresponding one of branch lines L4 to L7. The terminal ends of the branch lines L4 to L7 are connected to input terminals of an OR circuit 15. The OR circuit 15 provides an output signal to the OR circuit 14 as a control signal A1.

Further, the gates of the transistors (switch circuits) supplying the buffer circuit groups 11b to 11e with low potential power receive the inverted signal of the control signal A through a corresponding clock tree branch line (not shown). The terminal ends of each of the branch lines are connected to input terminals of an OR circuit (not shown). This OR circuit provides an output signal to the OR circuit 14 as a control signal A2.

Accordingly, with regard to the buffer circuit groups 11b to 11e in the clock tree network provided with the clock signal CLK from the same GCB, the clock tree network 1100 of the eighth embodiment has the same advantages as the clock tree network 900 of the sixth embodiment.

Further, the OR circuit 15, which is provided with the control signal A from the branch lines L4 to L7 of the clock tree, determines the voltage level of each of the branch lines L4 to L7 and provides the control signal A1 to the OR circuit 14. This shortens the length of the wire for providing the buffer circuit groups 11b to 11e with a control signal. Further, the OR circuit 15 functions as a buffer for the control signal A1.

Accordingly, in comparison with the clock tree network 1000 of the seventh embodiment, the propagation speeds of the control signals A1 and A2 are increased. Further, the time from when the control signal A falls to when the GCB is activated is shortened.

It should be apparent to those skilled in the art that the present invention may be embodied in many other specific forms without departing from the spirit or scope of the invention. Particularly, it should be understood that the present invention may be embodied in the following forms.

The transmission control circuit may be a circuit other than a GCB.

The present examples and embodiments are to be considered as illustrative and not restrictive, and the invention is not to be limited to the details given herein, but may be modified within the scope and equivalence of the appended claims.

What is claimed is:

1. A power consumption reduction circuit for use in a clock network including a power supply and a buffer circuit group for transmitting a clock signal, the power consumption reduction circuit comprising:
    a transmission control circuit for controlling transmission of the clock signal to the buffer circuit group in response to a control signal so as to selectively provide and interrupt the clock signal; and
    a switch circuit, connected between the buffer circuit group and the power supply, for disconnecting the buffer circuit group and the power supply when the transmission control circuit interrupts the clock signal,
    wherein the switch circuit disconnects the power supply and the buffer circuit group in response to the control signal so that the switch circuit is synchronized with the transmission control circuit.

2. The power consumption reduction circuit according to claim 1, wherein the transmission control circuit interrupts the clock signal in response to a control signal, and the switch circuit disconnects the buffer circuit group and the power supply in response to the control signal.

3. The power consumption reduction circuit according to claim 2, wherein the buffer circuit group includes a plurality of transistors each having a threshold, and the switch circuit includes a transistor activated in response to the control signal and having a higher threshold than the threshold of each transistor in the buffer circuit group.

4. The power consumption reduction circuit according to claim 2, wherein the transmission control circuit provides the clock signal to the buffer circuit group in response to the control signal after the switch circuit is activated.

5. The power consumption reduction circuit according to claim 1, wherein the buffer circuit includes a plurality of power supply nodes, and the switch circuit is one of a plurality of switches respectively connected to the power supply nodes.

6. The power consumption reduction circuit according to claim 5, further comprising:
    a capacitor connected between the power supply nodes and the power supply.

7. The power consumption reduction circuit according to claim 6, wherein the buffer circuit group includes a plurality of series-connected inverter circuits, and the switch circuit is one of a plurality of switch circuits respectively connected to the inverter circuits.

8. The power consumption reduction circuit according to claim 1, wherein the buffer circuit group includes an output node for outputting the clock signal, the power consumption reduction circuit further comprising:
 a clamp circuit, connected to the output node, for clamping the output node at the level of the power supply when the buffer circuit is inactivated.

9. The power consumption reduction circuit according to claim 8, further comprising:
 a line for providing the control signal to the switch circuit, the line including a terminal end; and
 an OR circuit, connected to the line, for performing an OR logical operation with potential of the control signal and potential at the terminal end of the line and providing the transmission control circuit with another control signal.

10. The power consumption reduction circuit according to claim 9, wherein the buffer circuit group is one of a plurality of parallel-connected buffer circuit groups and the switch circuit is a plurality of switch circuits respectively connected to the plurality of parallel-connected buffer circuits groups, the power consumption reduction circuit further comprising:
 a single line, connected to the plurality of switch circuits, for providing the control signal to the plurality of switch circuits.

11. The power consumption reduction circuit according to claim 9, wherein the buffer circuit group is one of a plurality of parallel-connected buffer circuit groups and the switch circuit is a plurality of switch circuits respectively connected to the plurality of parallel-connected buffer circuits groups, the power consumption reduction circuit further comprising:
 a plurality of lines, respectively connected to the plurality of switch circuits, for providing the control signal to the plurality of switch circuits.

12. A clock network for use with a power supply, the clock network comprising:
 a buffer circuit group for transmitting a clock signal;
 a transmission control circuit for controlling transmission of the clock signal to the buffer circuit group in response to a control signal so as to selectively provide and interrupt the clock signal; and
 a switch circuit, connected between the buffer circuit group and the power supply, for disconnecting the buffer circuit group and the power supply when the transmission control circuit interrupts the clock signal,
 wherein the switch circuit disconnects the power supply and the buffer circuit group in response to the control signal so that the switch circuit is synchronized with the transmission control circuit.

13. The clock network according to claim 12, wherein the transmission control circuit interrupts the clock signal in response to a control signal, and the switch circuit disconnects the buffer circuit group and the power supply in response to the control signal.

14. The clock network according to claim 13, wherein the buffer circuit group includes a plurality of transistors each having a threshold, and the switch circuit includes a transistor activated in response to the control signal and having a higher threshold than the of each transistor in the buffer circuit group.

15. The clock network according to claim 13, wherein the transmission control circuit provides the clock signal to the buffer circuit group in response to the control signal after the switch circuit is activated.

16. The clock network according to claim 12, wherein the buffer circuit includes a plurality of power supply nodes, and the switch circuit is one of a plurality of switches respectively connected to the power supply nodes.

17. The clock network according to claim 16, further comprising:
 a capacitor connected between the power supply nodes and the power supply.

18. The clock network according to claim 17, wherein the buffer circuit group includes a plurality of series-connected inverter circuits, and the switch circuit is one of a plurality of switch circuits respectively connected to the inverter circuits.

19. The clock network according to claim 12, wherein the buffer circuit group includes an output node for outputting the clock signal, the clock network further comprising:
 a clamp circuit, connected to the output node, for clamping the output node at the level of the power supply when the buffer circuit is inactivated.

20. The clock network according to claim 19, further comprising:
 a line for providing the control signal to the switch circuit, the line including a terminal end; and
 an OR circuit, connected to the line, for performing an OR logical operation with potential of the control signal and potential at the terminal end of the line and providing the transmission control circuit with another control signal.

* * * * *